(12) United States Patent
Charier et al.

(10) Patent No.: US 9,057,326 B2
(45) Date of Patent: Jun. 16, 2015

(54) SYSTEM OF COMPACT CONTRA-ROTATING PROPELLERS

(75) Inventors: Gilles Alain Charier, La Grande Paroisse (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 947 days.

(21) Appl. No.: 13/148,404

(22) PCT Filed: Feb. 11, 2010

(86) PCT No.: PCT/EP2010/051675
§ 371 (c)(1),
(2), (4) Date: Aug. 8, 2011

(87) PCT Pub. No.: WO2010/092094
PCT Pub. Date: Aug. 19, 2010

(65) Prior Publication Data
US 2011/0311361 A1    Dec. 22, 2011

(30) Foreign Application Priority Data

Feb. 13, 2009  (FR) .................................... 09 50907

(51) Int. Cl.
*F02C 3/067*     (2006.01)
*F01D 1/24*      (2006.01)
(Continued)

(52) U.S. Cl.
CPC . *F02C 3/067* (2013.01); *F01D 1/24* (2013.01); *F04D 19/024* (2013.01);
(Continued)

(58) Field of Classification Search
CPC ....... F01D 1/24; F04D 19/024; F04D 19/026; F02C 3/067; F02C 7/36; F05D 2260/40311; F05D 2240/90; F02K 3/072; Y02T 50/671

USPC ........ 416/170 R, 128, 129; 415/122.1, 124.2, 415/68, 69; 475/346, 347
See application file for complete search history.

(56) References Cited

U.S. PATENT DOCUMENTS 4,688,995 A * 8/1987 Wright et al. ................. 416/127
4,738,589 A * 4/1988 Wright .......................... 416/127
(Continued)

FOREIGN PATENT DOCUMENTS

DE    10 2005 059 438 B3   7/2007
EP         0 420 746 A1    4/1991
FR         2 660 362 A1   10/1991

OTHER PUBLICATIONS

U.S. Appl. No. 14/164,827, filed Jan. 27, 2014, Hugon, et al.
(Continued)

*Primary Examiner* — Nathaniel Wiehe
*Assistant Examiner* — Wayne A Lambert
(74) *Attorney, Agent, or Firm* — Oblon, McClelland, Maier & Neustadt, L.L.P.

(57) ABSTRACT

A system of contra-rotating propellers for an aircraft jet engine, including: a free power turbine; a first and second propeller, contra-rotating, the first propeller being placed in a predetermined direction relative to the second propeller, each including a hub, an outer ferrule, and coupling arms linking the two; and a casing inserted between the free turbine and the propellers, the propellers arranged in the predetermined direction relative to the casing and the free turbine arranged in the opposite direction relative to the casing, the casing including a casing extension in the given direction, rotatably supporting the hub of the propeller. The coupling arms extend in the opposite direction, radially towards the outside.

18 Claims, 5 Drawing Sheets

(51) Int. Cl.
  *F04D 19/02* (2006.01)
  *F02C 7/36* (2006.01)
  *F02K 3/072* (2006.01)

(52) U.S. Cl.
  CPC ............... *F04D 19/026* (2013.01); *F02C 7/36* (2013.01); *F02K 3/072* (2013.01); *Y02T 50/671* (2013.01); *F05D 2240/90* (2013.01); *F05D 2260/40311* (2013.01)

(56) References Cited

U.S. PATENT DOCUMENTS

| | | | |
|---|---|---|---|
| 4,817,382 A * | 4/1989 | Rudolph et al. | ............... 60/268 |
| 4,951,461 A | 8/1990 | Butler | |
| 4,976,102 A | 12/1990 | Taylor | |
| 5,010,729 A * | 4/1991 | Adamson et al. | ............ 60/226.1 |
| 5,028,207 A * | 7/1991 | Rohra et al. | ............... 416/129 |
| 5,054,998 A * | 10/1991 | Davenport | ........................ 416/1 |
| 5,103,635 A | 4/1992 | Lardellier | |
| 5,131,813 A | 7/1992 | Przytulski et al. | |
| 5,156,648 A * | 10/1992 | Hora | .............................. 416/160 |
| 6,209,311 B1 | 4/2001 | Itoh et al. | |
| 2011/0243735 A1 | 10/2011 | Balk et al. | |

OTHER PUBLICATIONS

U.S. Appl. No. 13/255,389, filed Sep. 8, 2011, Charier, et al.
International Search Report issued on Mar. 11, 2010 in PCT/EP2010/051675, Jun. 6, 2011.

\* cited by examiner

SYSTEM OF COMPACT CONTRA-ROTATING PROPELLERS

TECHNICAL FIELD

The present invention generally relates to a system of contra-rotating propellers, for an aircraft turbomachine.

The invention also relates to a turbomachine for an aircraft comprising such a contra-rotating propeller system.

The invention preferably applies to aircraft turbomachines, for example of the turbojet engine or turboprop type. It more particularly applies to so-called "open rotor" turbomachines, within which a power free turbine drives the contra-rotating propellers, directly or indirectly via mechanical transmission device forming a reducer and in particular comprising an epicyclic gearing. In these contra-rotating propeller systems, the propellers therefore do not have a fairing at their outer radial ends.

BACKGROUND OF THE INVENTION

In the prior art, turbomachines are known with contra-rotating propeller systems, the propellers of which are driven by a mechanical transmission device, typically assuming the form of a differential reducer. This differential reducer has a particular epicyclical gearing, the sun gear of which is made to rotate by a rotor of a power free turbine, whereof the planet carrier drives the first propeller, and the crown of which drives the second propeller. In this respect, it is noted that as a function of the position of the contra-rotating propellers relative to the power free turbine driving them, the first propeller constitutes the downstream propeller and the second propeller, the upstream propeller, or vice versa. Whatever the case may be, unlike a simple epicyclical gearing, the crown is not stationary, but mobile.

Usually, each of the first and second propellers comprises a hub centered on the longitudinal axis, an outer ferrule being arranged concentrically thereto and participating in outwardly radially delimiting a main annular tunnel of the turbomachine, as well as coupling arms connecting the outer ferrule to the hub.

Moreover, a casing is provided, inserted between the power free turbine and the first and second propellers. This casing has a casing extension towards the closest propeller, this extension rotatably supporting the hub of said propeller.

This configuration means that a significant part of the aforementioned propeller, or even the entirety thereof, is axially offset from the casing extension ensuring its rotatable support. This results in a cantilever that is delicate to manage from a mechanical perspective, and generally requiring a substantial elongation of the casing extension, in particular with the aim of moving the rolling bearings apart so as to procure an acceptable rotational guiding.

This constraint amounts to an axial elongation of the propeller system, which is costly both in terms of overall mass and bulk.

BRIEF DESCRIPTION OF THE INVENTION

The invention therefore aims to at least partially resolve the aforementioned drawbacks, relative to the embodiments of the prior art.

To that end, the invention first relates to a system of contra-rotating propellers for an aircraft jet engine, comprising:

a free power turbine;

a first propeller and a second propeller, contra-rotating, intended to be rotated around a longitudinal axis of the system of propellers, the former being placed in a predetermined direction relative to the latter, each one of the first and second propellers comprising a hub centered on the longitudinal axis, an outer ferrule being arranged concentrically thereto and participating in the outward radial definition of the main annular tunnel, as well as coupling arms linking the outer ferrule to said hub;

a mechanical transmission device driven by said power free turbine and driving said first and second propellers; and a casing inserted between the power free turbine and the first and second propellers, the latter being arranged in the predetermined direction relative to the casing and the free turbine being arranged in the opposite direction relative to said same casing, the latter having a casing extension in the given direction, rotatably supporting the hub of the propeller.

According to the invention, the coupling arms of the second propeller extend in said opposite direction, radially towards the outside.

The invention therefore cleverly provides for inclining the coupling arms of the second propeller so that they come closer to the casing while going radially towards the outside, which globally makes it possible to bring the blades closer to said casing.

One consequence of this approach of the blades towards the casing lies in the decrease of the length of the propeller system, in the axial direction. This results in mass and bulk gains.

Another consequence of this approach lies in the limitation of the part of the second propeller cantilevered relative to the casing extension. In other words, the specific incline of the coupling arms makes it possible to offset the center of the masses of the second propeller towards the casing, thereby reducing the cantilever relative to the embodiments previously encountered. As a result, the casing extension serving to guide the hub of the second propeller can be smaller in the axial direction, given that the spacing required between the rolling bearings is also decreased relative to the earlier solutions with a more substantial cantilever. This results in an additional gain in terms of mass and bulk.

The invention is applicable to all turbomachines, in particular so-called "open rotor" turbomachines. In the latter case, the invention applies whether the propeller system is arranged upstream or downstream of the gas generator. In each of these two cases, within the propeller system, it is possible to consider placing the power turbine upstream or downstream of the contra-rotating propellers. This is also applicable for the position of the epicyclic gearing relative to the propellers.

Preferably, said predetermined direction is the downstream direction. In this way, the first propeller is the downstream propeller, and said second propeller is the upstream propeller. This specific arrangement is in particular chosen when the propeller system is arranged downstream of the gas generator of the turbomachine, i.e. when the latter adopts a design ensuring propulsion, called "pusher" design. Naturally, an opposite design could be considered, in which said predetermined direction would be the upstream direction, without going beyond the scope of the invention. Said first propeller would then be the upstream propeller, and said second propeller would be the downstream propeller. This other solution is in particular chosen when the propeller system is arranged upstream of the gas generator of the turbomachine, i.e. when the latter adopts a design ensuring traction, called "puller" design.

Whatever the design considered amongst those mentioned above, it is preferably done so that at least one portion of each coupling arm belonging to the second propeller is located in said opposite direction relative to a rolling bearing inserted between said casing extension and said hub of the second propeller.

Similarly, it is preferable for the second propeller to comprise a plurality of blades each mounted so as to be steered in incidence around a pivot axis, and for said pivot axis to be situated in said opposite direction relative to a rolling bearing inserted between said casing extension and said hub of the second propeller.

The two configurations described above, made possible owing to the specific incline of the arms of the second propeller, indeed illustrate the ability offered by the present invention to re-center the masses of said second propeller towards the casing that separates it from the power free turbine.

Preferably, the hub of said second propeller rotatably supports said hub of said first propeller.

Preferably, said coupling arms of the first propeller extend in said predetermined direction going radially outwardly, although any other configuration could be chosen, without going beyond the scope of the invention.

Preferably, said coupling arms of the first propeller support a first intermediate ferrule participating in the radial inward definition of the primary annular tunnel, and said coupling arms of the second propeller support a second intermediate ferrule participating in the radial inward definition of the main annular tunnel, the first intermediate ferrule being situated in the continuity of said second ferrule in said given direction.

Preferably, the coupling arm of the first propeller and its associated outer and intermediate ferrules form a part made in a single piece, and the coupling arms of the second propeller and its associated outer and intermediate ferrules also form a part made in a single piece. Alternatively, each of these two single-piece assemblies could be made by several parts attached to each other.

As mentioned above, said predetermined direction is preferably the downstream direction.

Preferably, said mechanical transmission device comprises an epicyclic gearing provided with a sun gear centered on said longitudinal axis and driven by the rotor of the power free turbine, at least one satellite meshing with said sun gear, a planet carrier driving said first propeller, as well as a crown meshing with each satellite and driving said second propeller.

Preferably, said planet carrier is secured to the hub of said second propeller, and said crown is secured to the hub of said second propeller.

Preferably, each outer ferrule supports a retaining ring of the blades of the concerned propeller.

Preferably, the first and second propellers each have a variable calibration system for their blades. In a known manner, these systems are steered so that the rotational speed of the two propellers is kept substantially constant during operation, irrespective of the rating.

The invention also relates to an aircraft turbomachine comprising a contra-rotating propeller system as described above, this turbomachine for example being a turboprop, but alternatively being able to be a turbojet engine with a contra-rotating fan. Naturally, in the latter case, the aforementioned mechanical transmission device is intended to move the contra-rotating fan of the turbojet engine. Preferably, as mentioned above, the invention more particularly applies to so-called "open-rotor" turbomachines, within which the power free turbine drives the two contra-rotating propellers, indirectly via a mechanical transmission device forming a reducer and in particular comprising an epicyclic gearing.

Other advantages and features of the invention will appear in the non-limiting detailed description below.

BRIEF DESCRIPTION OF THE DRAWINGS

This description will be provided in reference to the appended drawings, in which.

DETAILED DESCRIPTION OF PREFERRED EMBODIMENTS

Figure 1:
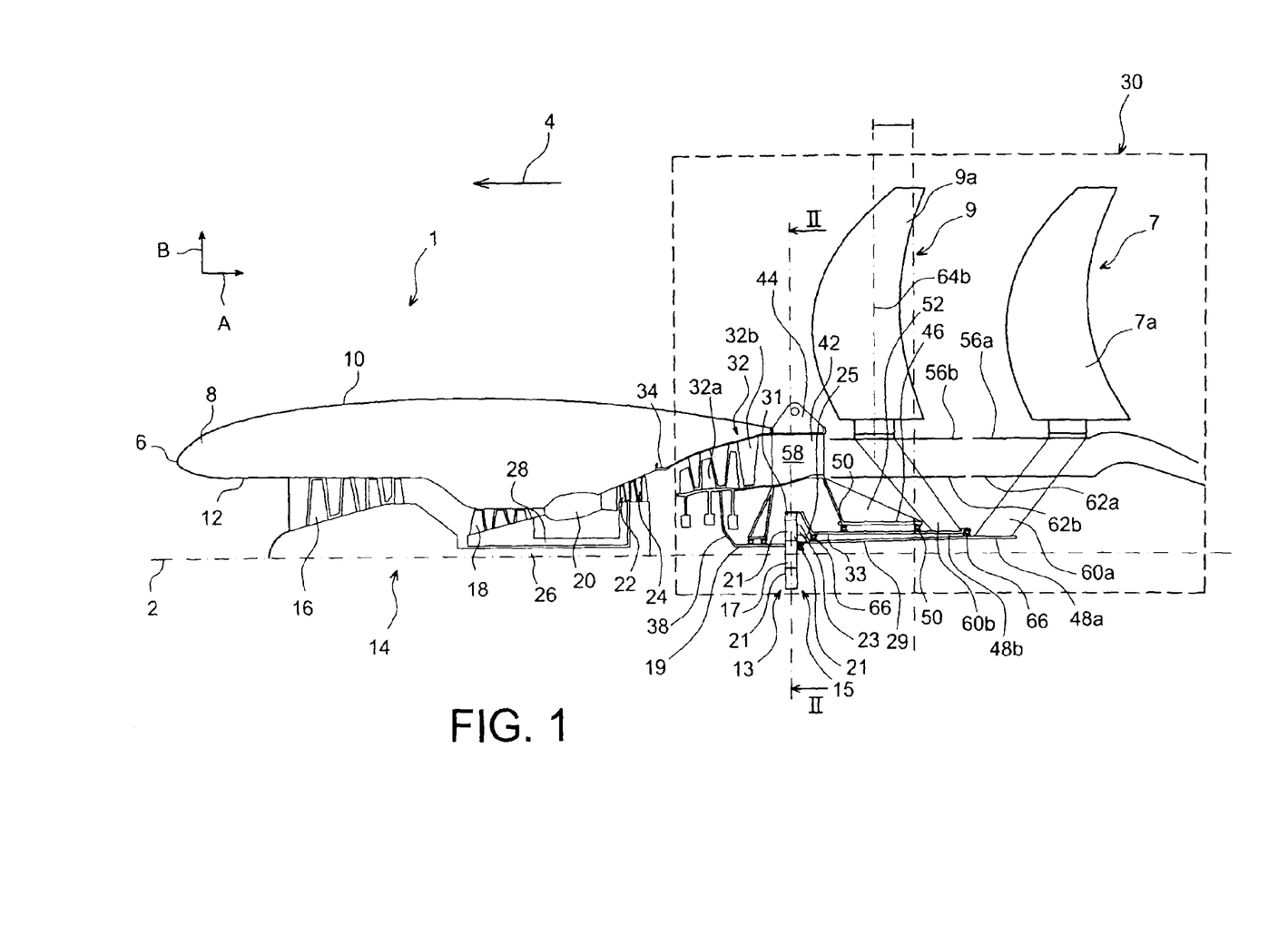
FIG. 1 shows a longitudinal half-cross-sectional diagrammatic view of an aircraft turbomachine, according to one preferred embodiment of the present invention.

FIG. 1 shows a turbomachine 1 of the "open rotor" type, according to one preferred embodiment of the present invention.

In the figures, direction A corresponds to the longitudinal or axial direction, parallel to the longitudinal axis 2 of the turbomachine. Direction B corresponds to the radial direction of the turbomachine. Furthermore, the arrow 4 diagrams the direction of travel of the aircraft under the actions of the thrust of the turbomachine 1, this direction of travel being opposite the main flow direction of the gases inside the turbomachine. The terms "front," "upstream," "back," "downstream" used in the rest of the description must be considered relative to said direction of travel 4.

In the front part, the turbomachine has an air inlet 6 continuing towards the rear through a nacelle 8, the latter globally including an outer skin 10 and an inner skin 12, both centered on the axis 2 and radially offset relative to each other.

The inner skin 12 forms an outer radial casing for a gas generator 14, traditionally comprising, from front to back, a low-pressure compressor 16, a high-pressure compressor 18, a combustion chamber 20, a high-pressure turbine 22, and an intermediate-pressure turbine 24. The compressor 16 and the turbine 24 are mechanically connected by a shaft 26, thereby forming a low-pressure body, while the compressor 18 and the turbine 22 are mechanically connected by a shaft 28, forming a higher-pressure body. Consequently, the gas generator 14 preferably has a traditional design, called "dual body".

Downstream of the intermediate pressure turbine 24, there is a contra-rotating propeller system 30, forming a receiver for the turbomachine.

This system 30 comprises a power free turbine 32, forming a low-pressure turbine. It includes a rotor 32a constituting the inner part of the turbine, as well as a stator 32b constituting the outer part of said turbine, which is fixedly connected to a fixed casing assembly 34 of said propeller system, centered on the longitudinal axis 2 of the system. In a known manner, this casing assembly 34 is intended to be secured to the other casings of the turbomachine. In this respect, it is indicated that the propeller system 30 is preferably designed so that the propellers do not have an outer radial fairing surrounding them, as shown in the figures.

Furthermore, downstream of the power free turbine 32, the propeller system 30 incorporates a first propeller 7 or downstream propeller, supporting blades 7a. Similarly, the system comprises a second propeller 9 or upstream propeller, supporting blades 9a. In this way, the propellers 7, 9 are offset from each other in direction 4, and both situated downstream of the free turbine 32.

The two propellers 7, 9 are intended to rotate in opposite directions around the axis 2 on which they are centered, the rotations being done relative to the stator 34, which remains immobile.

To drive these two propellers 7, 9 in rotation, a mechanical transmission device 13 is provided, forming a reducer and in particular comprising an epicyclic gearing 15.

Figure 2:
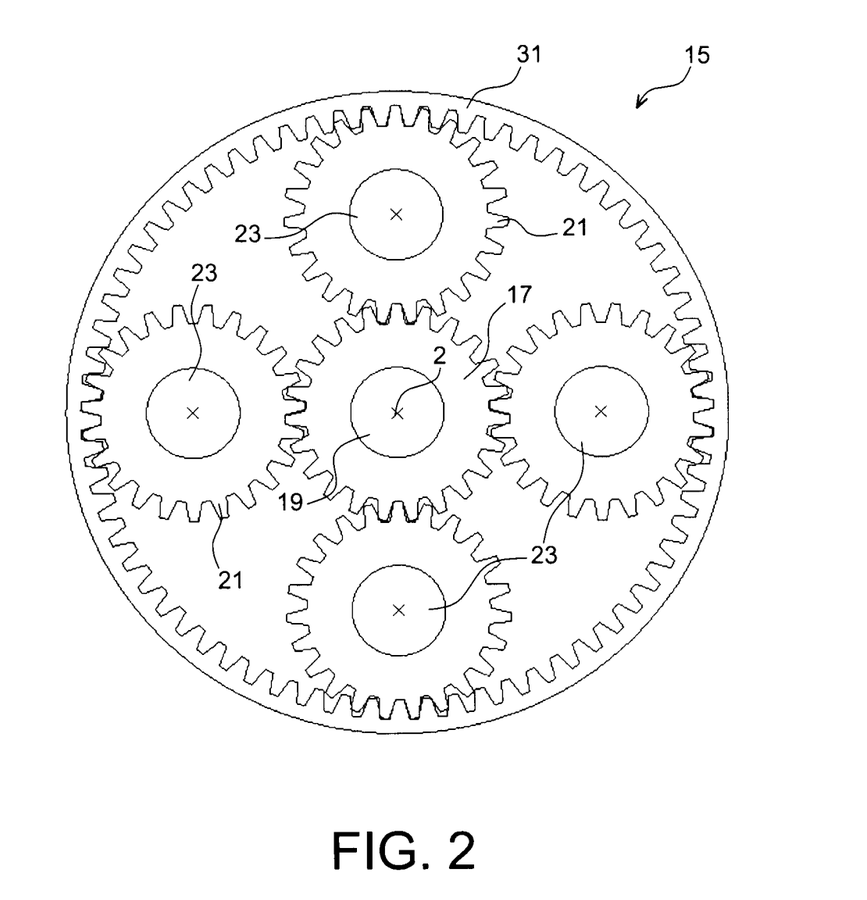
FIG. 2 shows a cross-sectional view along line II-II of FIG. 1.

In reference to FIGS. 1 and 2, the gearing 15 is provided with a sun gear 17 centered on the longitudinal axis 2, and supported by a sun gear shaft 19 with the same axis, integrally connected upstream of the rotor 32a, via a flange 38. In this way, the rotor 32a directly drives the sun gear 17 in rotation, the latter assuming the form of an outwardly toothed wheel.

The gearing 15 also has a satellite 21, and preferably as shown in FIG. 2, each of them mesh with the sun gear 17. Each satellite 21 is supported by a sun gear shaft 23 with an axis off-centered relative to the shaft 2, and assumes the form of an outwardly toothed wheel.

Moreover, the gearing 15 is equipped with a planet carrier 25 centered on the longitudinal axis 2, and rotatably supporting each of the planets 21, via shafts 23, respectively, the planet carrier 25 is supported by a planet carrier shaft 29 with the same axis, secured to the first propeller 7, as visible in FIG. 1, so as to be able to drive it directly in rotation.

Lastly, the gearing 15 has a crown 31 centered on the axis 2 and supported by a crown shaft 33 with the same axis, this crown 31 meshing with each planet 21. The shaft 33 extends downstream and is secured to the second propeller 9, so as to be able to drive it directly in rotation. For example, this shaft 33 is situated around the planet carrier shaft 29 with which it is concentric. The crown 31 also assumes the form of an inwardly toothed wheel.

In the described preferred embodiment, in which each propeller is equipped with a system for variable calibration of its blades, the epicyclic gearing 15 is situated at and inside a casing 42 inserted between the power free turbine 32 and the propellers 7, 9. This casing 42, also called escapement casing or "static frame," supports an engine mount 44 intended to ensuring mounting of the turbomachine on the aircraft structure, as in particular is visible in FIGS. 1, 3a and 3b. In general, it is indicated that the mechanical transmission device is housed in the hub of the casing 42.

The casing 42, downstream of which the propellers are located and upstream of which the power turbine 32 is located, comprises a casing extension 46 extending downstream relative to a central portion of said casing. This extension 46 assumes the form of a hollow cylinder centered on the longitudinal axis 2, rotatably supporting a hub 48b of the second propeller, said hub 48b being combined with the crown shaft 33, as shown in FIG. 1. This rotatable support is done via two rolling bearings 50 spaced apart from each other in direction A, and inserted between the extension 46 and the hub 48b. To increase the rigidity and mechanical maintenance of the extension 46, the latter is connected to the central portion of the casing 42 via reinforcing ribs 52, distributed all around said extension and each extending radially.

The second propeller 9 also has an outer ferrule 56b arranged concentrically to the hub 48b, and participating in outwardly radially defining a main annular tunnel 58.

Furthermore, it also comprises a plurality of coupling arms 60b connecting the outer ferrule 56b to the hub 48b. One of the particularities of the present invention consists of providing that each arm 60b extends from an inner radial arm, secured to a portion of the hub 48b protruding downstream of the casing extension 46, towards an outer radial end secured to the ferrule 56b, going in the upstream direction. In cross-sectional as shown in FIG. 1, the angle between the arms 60b and the direction B can be between 20 and 50°.

Figure 3A:
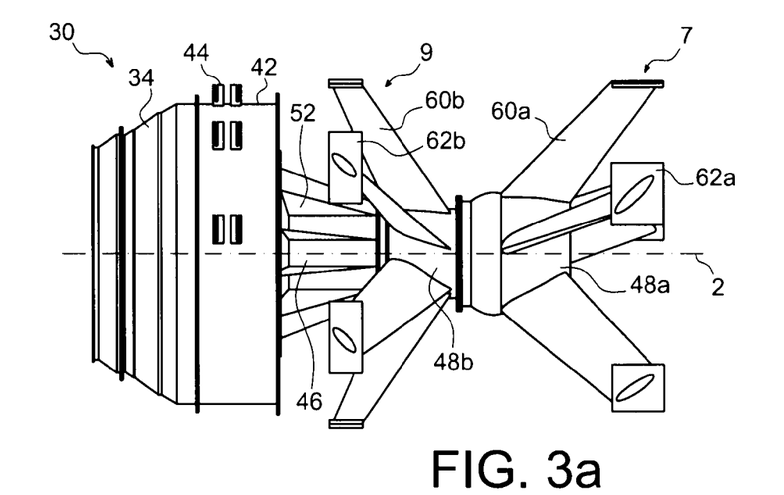
FIGS. 3a and 3b show partial perspective views, following different angles, of the contra-rotating propeller system equipping the turbomachine shown in FIG. 1.
Figure 3B:
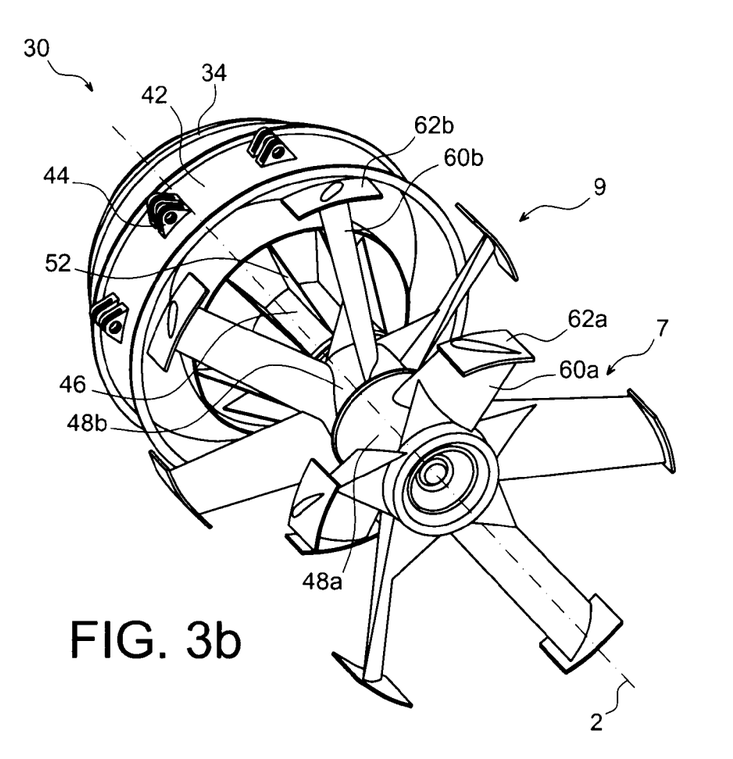

Moreover, the coupling arms 60b of the second propeller support a second intermediate ferrule 62b arranged between the hub 48b and the outer ferrule 56b, this ferrule 62b participating in inwardly radially defining the main annular tunnel 58. Naturally, the hub 48b, the arms 60b arranged in a star as shown in FIGS. 3a and 3b, and the ferrules 62b, 56b form an assembly rotatably secured along the axis 2.

In the illustrated preferred embodiment, it is made so that, to limit the cantilever at the casing extension 46, at least one portion of each coupling arm 60b is situated upstream of the rolling bearing 50 furthest downstream. Due to the specific incline of the arms 60b, this involves the radially external portion of these arms. Moreover, FIG. 1 shows that each blade 9a is mounted so that it can be steered in incidence around its pivot axis 64b, by its variable calibration system (not shown). Still to limit the cantilever, it is done so that this pivot axis 64b, and more generally the transverse plane incorporating the set of axes 64b of the blades 9a, is situated upstream of the furthest downstream rolling bearing 50.

The crown shaft 33 assumes the form of a hollow cylinder centered on the axis 2, rotatably supporting a hub 48a of the first propeller, this hub 48a being combined with the planet carrier shaft 29, as shown in FIG. 1. This rotatable support is done via two rolling bearings 66 spaced apart from each other in direction A, and inserted between the two hubs 48b, 48a.

The first propeller 7 also has an outer ferrule 56a arranged concentrically to the hub 48a, and participating in outwardly radially defining the main annular tunnel 58. It is situated in the downstream aerodynamic extension 56b of the second propeller.

Moreover, it also comprises a plurality of coupling arms 60a connecting the outer ferrule 56a to the hub 48a. Here, each arm 60a extends from an inner radial end, secured to a portion of the hub 48a protruding towards the downstream direction of the hollow hub 48b, towards an external radial end secured to the ferrule 56a, going in the downstream direction. In cross-section like that shown in FIG. 1, the angle between the arms 60a and the direction B can be between 20 and 50°. Nevertheless, any other configuration can be considered, the inclines chosen for the arms 60a, 60b depending in particular on the desired spacing between the blades 9a and 7a, in direction A, in particular to respond to the acoustic stresses. As an illustrative example, the arms 60a could be inclined in the upstream direction in the same way as the coupling arms 60b.

Aside from their incline in the axial direction, the coupling arms can also be calibrated relative to the flow in the tangential direction, so as to limit the drag caused by them.

Furthermore, the coupling arms 60a of the first propeller support a first intermediate ferrule 62a arranged between the hub 48a and the outer ferrule 56a, this ferrule 62a participating in radially inwardly defining the main annular tunnel 58. It is situated in the downstream aerodynamic extension of the intermediate ferrule 62b of the second propeller. Naturally, the hub 48a, the arms 60a arranged in a star as shown in FIGS. 3a and 3b, and the ferrules 62a, 56a form an assembly rotatably secured along the axis 2. For information, it is noted that in FIGS. 3a and 3b, for clarity reasons, the outer ferrules 56a, 56b have voluntarily been omitted, while the intermediate ferrules 62a, 62b have been shown interrupted.

Figure 4:
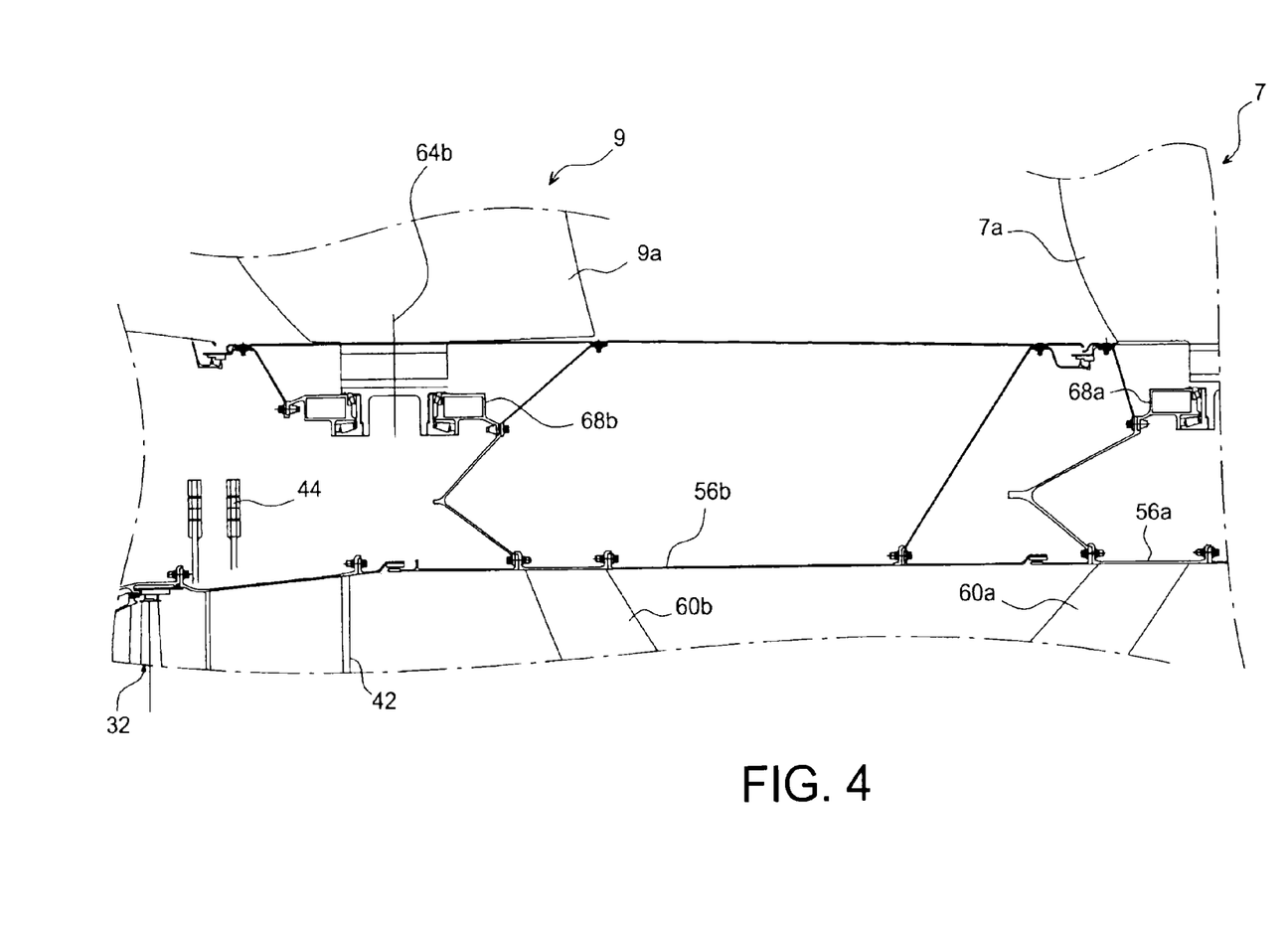
FIG. 4 shows an enlarged cross-sectional view of part of the contra-rotating propeller system shown in the preceding figures.

In FIG. 4, one can see that the outer ferrule 56b of the second propeller, which extends between the casing 42 and the ferrule 56a in one or several parts attached to each other, supports a retaining ring 68b of the blades 9a. This ring 68b, having a plurality of holes each intended to receive the foot of a blade 9a, is globally situated towards the upstream direction relative to the outer radial ends of the coupling arms 60b. Similarly, the outer ferrule 56a of the first propeller, which extends in the downstream direction from the ferrule 56b in one or several parts attached to each other, supports a retaining ring 68a of the blades 7a. This ring 68a, having a plurality of holes each intended to receive the foot of a blade 7a, is globally situated at the outer radial ends of the coupling arms 60a.

According to one particular embodiment, a first single-piece assembly is formed by the coupling arm 60a and by the outer ferrule 56a and the intermediate ferrule 62a, just as another single-piece assembly is formed by the coupling arms 60b and by the outer ferrules 56b and the intermediate ferrule 62b.

Figure 5:
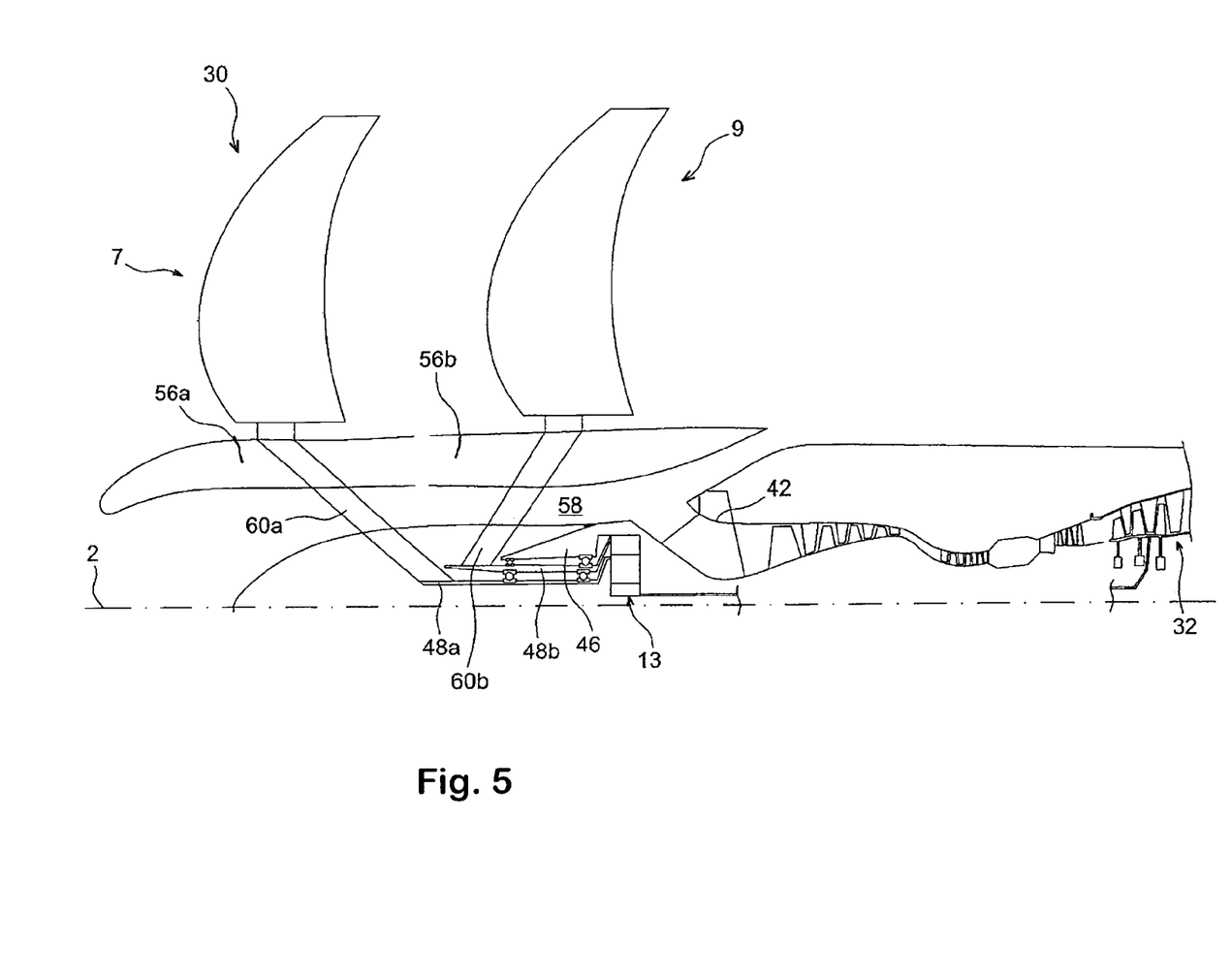
FIG. 5 shows a longitudinal half-cross-sectional diagrammatic view of an aircraft turbomachine, according to another embodiment of the present invention.

FIG. 5 shows another embodiment, in which the propeller system is arranged upstream of the gas generator of the turbomachine. In the "puller design" shown in FIG. 5, the predetermined direction would be the upstream direction. The first propeller is the upstream propeller, and the second propeller is the downstream propeller.

Of course, various modifications can be made by one skilled in the art to the invention described above, purely as non-limiting examples.

The invention claimed is:

1. A system of contra-rotating propellers for an aircraft jet engine, comprising:
    a power free turbine;
    a first propeller and a second propeller, contra-rotating configured to be rotated around a longitudinal axis of the system of propellers, the first propeller being placed in a downstream direction relative to the second propeller, each of the first and second propellers comprising a hub centered on the longitudinal axis, an outer ferrule being arranged concentrically thereto and participating in an outward radial definition of a main annular tunnel, and coupling arms linking the outer ferrule to the hub;
    a mechanical transmission device driven by the power free turbine and driving the first and second propellers; and
    a casing inserted between the power free turbine and the first and second propellers, the first and second propellers being arranged in the downstream direction relative to the casing and the power free turbine being arranged in an upstream direction relative to the casing, the casing including a casing extension extending in the downstream direction, the casing extension rotatably supporting the hub of at least one of the propellers,
    wherein the coupling arms of the second propeller extend in the upstream direction and radially outward.

2. The system of contra-rotating propellers according to claim 1, wherein at least one portion of each coupling arm belonging to the second propeller is located in the upstream direction relative to a rolling bearing inserted between the casing extension and the hub of the second propeller.

3. The system of contra-rotating propellers according to claim 1, wherein the second propeller comprises a plurality of blades each mounted so as to be steered in incidence around a pivot axis, the pivot axis to be situated in the upstream direction relative to a rolling bearing inserted between the casing extension and the hub of the second propeller.

4. The system of contra-rotating propellers according to claim 1, wherein the hub of the second propeller rotatably supports the hub of the first propeller.

5. The system of contra-rotating propellers according to claim 1, wherein the coupling arms of the first propeller extend in the downstream direction and radially outward.

6. The system of contra-rotating propellers according to claim 5, wherein the coupling arms of the first propeller extend in the downstream direction and radially outward so as to present an angle with respect to a radial direction of the engine.

7. The system of contra-rotating propellers according to claim 6, wherein the angle is between 20 and 50 degrees.

8. The system of contra-rotating propellers according to claim 1, wherein the coupling arms of the first propeller support a first intermediate ferrule participating in a radial inward definition of the main annular tunnel, and the coupling arms of the second propeller support a second intermediate ferrule participating in the radial inward definition of the main annular tunnel, the first intermediate ferrule being situated in continuity of the second ferrule in the downstream direction.

9. The system of contra-rotating propellers according to claim 8, wherein the coupling arm of the first propeller and its associated outer and intermediate ferrules form a part made in a single piece, and the coupling arms of the second propeller and its associated outer and intermediate ferrules also form a part made in a single piece.

10. The system of contra-rotating propellers according to claim 1, wherein the mechanical transmission device comprises an epicyclic gearing including a sun gear centered on the longitudinal axis and driven by a rotor of the power free turbine, at least one satellite meshing with the sun gear, a planet carrier driving the first propeller, and a crown meshing with each satellite and driving the second propeller.

11. The system of contra-rotating propellers according to claim 10, wherein the planet carrier is secured to the hub of the first propeller, and the crown is secured to the hub of the second propeller.

12. The system of contra-rotating propellers according to claim 1, wherein the mechanical transmission device is housed in a hub of the casing.

13. The system of contra-rotating propellers according to claim 1, wherein each outer ferrule supports a retaining ring of blades of the respective propeller.

14. An aircraft turbomachine comprising a contra-rotating propeller system according to claim 1.

15. The turbomachine according to claim 14, wherein the turbomachine is an open rotor.

16. The system of contra-rotating propellers according to claim 1, wherein the coupling arms of the second propeller extend in the upstream direction and radially outward so as to present an angle with respect to a radial direction of the engine.

17. The system of contra-rotating propellers according to claim 16, wherein the angle is between 20 and 50 degrees.

18. A system of contra-rotating propellers for an aircraft jet engine, comprising:
    a power free turbine;
    a first propeller and a second propeller, contra-rotating configured to be rotated around a longitudinal axis of the system of propellers, the first propeller being placed in an upstream direction relative to the second propeller, each of the first and second propellers comprising a hub centered on the longitudinal axis, an outer ferrule being arranged concentrically thereto and participating in an outward radial definition of a main annular tunnel, and coupling arms linking the outer ferrule to the hub;
    a mechanical transmission device driven by the power free turbine and driving the first and second propellers; and a casing inserted between the power free turbine and the first and second propellers, the first and second propellers being arranged in the upstream direction relative to the casing and the power free turbine being arranged in a downstream direction relative to the casing, the casing including a casing extension extending in the upstream direction, the casing extension rotatably supporting the hub of at least one of the propellers, wherein the coupling arms of the second propeller extend in the downstream direction and radially outward.

\* \* \* \* \*

UNITED STATES PATENT AND TRADEMARK OFFICE
CERTIFICATE OF CORRECTION

PATENT NO. : 9,057,326 B2
APPLICATION NO. : 13/148404
DATED : June 16, 2015
INVENTOR(S) : Gilles Alain Charier et al.

It is certified that error appears in the above-identified patent and that said Letters Patent is hereby corrected as shown below:

In The Specification

Column 4, line 67, change "the system" to --the system 30--.

Signed and Sealed this
Sixteenth Day of February, 2016

Michelle K. Lee
*Director of the United States Patent and Trademark Office*